Dec. 19, 1933.  F. E. HOLMES ET AL  1,939,776
APPARATUS FOR PRODUCING ACTIVITY OR WORK BY ATMOSPHERIC
CONDITIONS AND DISPLAYING THE SAME
Original Filed Feb. 23, 1932   2 Sheets-Sheet 1
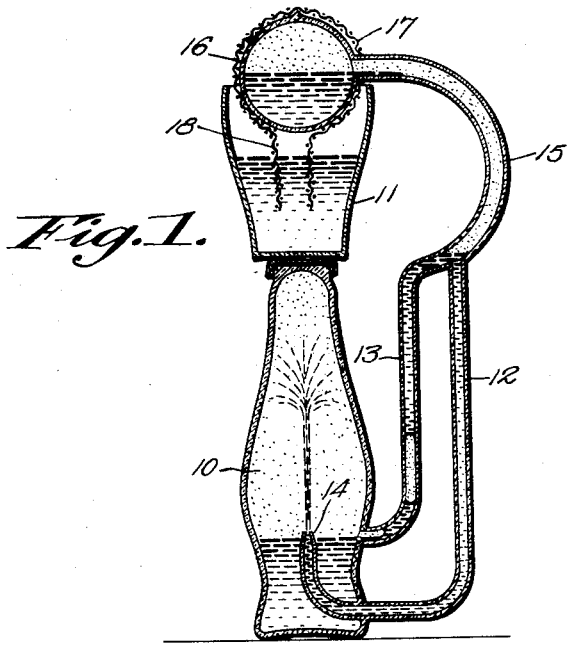
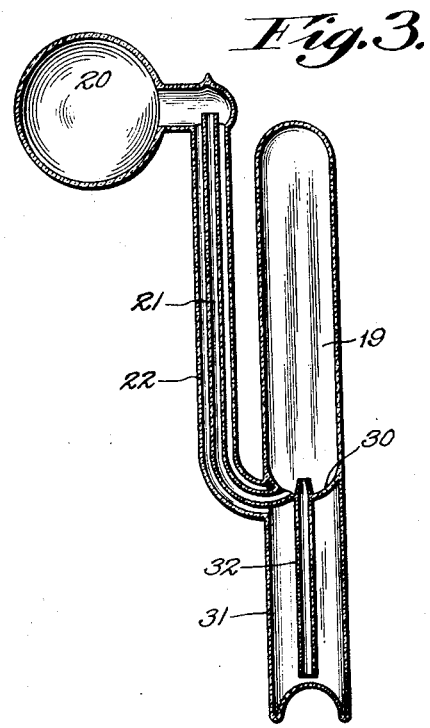
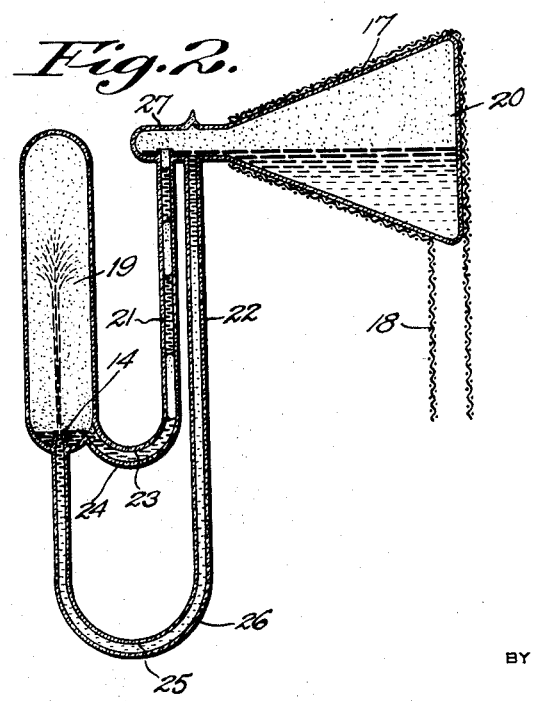
INVENTORS
Frederic E. Holmes
Arnon O. Snoddy
BY
Wood & Wood ATTORNEYS

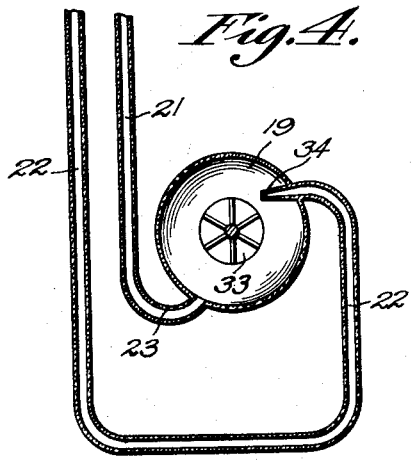
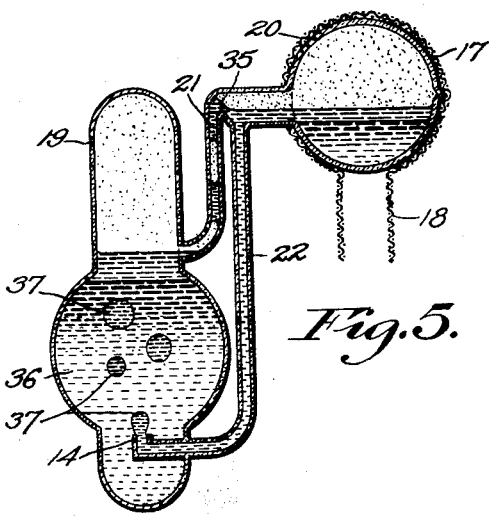
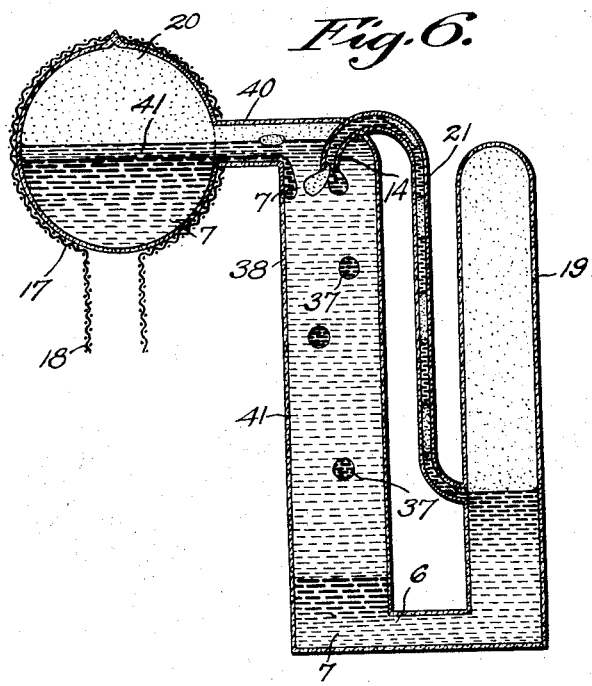

Patented Dec. 19, 1933

1,939,776

UNITED STATES PATENT OFFICE 1,939,776

APPARATUS FOR PRODUCING ACTIVITY OR WORK BY ATMOSPHERIC CONDITIONS AND DISPLAYING THE SAME

Frederic E. Holmes, St. Bernard, and Arnon O. Snoddy, Cincinnati, Ohio

Continuation of application Serial No. 594,672, February 23, 1932. This application November 5, 1932. Serial No. 641,448

15 Claims. (Cl. 35—16)

This invention relates to apparatus for producing activity or work by utilizing energy created by the heat contained in the atmosphere and brought into operation by a difference in temperature between two parts of the apparatus, and is particularly directed to devices for displaying this work or activity for advertising purposes or purposes of demonstrating the principles of evaporation, condensation, vaporization, and hydrostatic pressure to students. These devices, operating because of temperature differences at respective portions as created by induced evaporation at one portion lowering the temperature below normal, display a vapor or liquid flow between the portions of the apparatus as vaporization and hydrostatic pressure are effective for creating a cycle of operation. The present application is a continuation of application Serial Number 594,672, filed February 23, 1932, by Frederic E. Holmes and Arnon O. Snoddy.

It is an object of this invention to provide an apparatus for fully displaying or exploiting a continuous or recurrent flow or movement of liquids and their vapors, seemingly created without energy, for the purpose of attracting attention in advertising primarily because the apparatus appears to accomplish perpetual motion. Further the purpose is to display the fullest amount of activity by the use of an extremely volatile liquid and a particular arrangement of chambers and tubes of the apparatus and by the adaptation of the known actions of evaporation, condensation, vaporization and hydrostatic pressure in a novel manner.

Other objects and further advantages will be more fully apparent from a description of the accompanying drawings, in which:

Figure 1 is a central sectional view illustrating the invention applied to a bottle and glass for creating and displaying a fountain in the bottle for advertising the contents of the bottle.

Figure 2 is a central sectional view of an apparatus similar to that shown in Figure 1 but without adaptation to a glass and bottle and including a variation in the arrangement of the hydrostatic tube and the gas or vapor flow tube between the chambers.

Figure 3 is a central sectional view of an apparatus similar to that of Figure 1 but showing an arrangement in which the hydrostatic and gas or vapor flow tubes have been placed one within the other.

Figure 4 is a fragmentary central sectional view of an apparatus in which a paddle wheel is operated within a glass chamber by means of a water jet or fountain.

Figure 5 is a central sectional view of an apparatus in which two liquids are used, one more volatile than the other, the more volatile liquid flowing upwardly through the other in the form of globules for display, gas flow and hydrostatic tubes being used.

Figure 6 is a central sectional view of an apparatus similar to that in Figure 5 in which a volatile liquid heavier than the other liquid is used which flows downwardly through the other liquid in the form of globules.

Regarded in a simple form, the apparatus of the present invention comprises two gas or vapor-tight containers connected by passages so arranged that by establishing different temperatures in the respective containers, liquid is caused to flow continuously or intermittently. Ethyl ether is suitable for filling the apparatus, the apparatus being evacuated and a portion of the ether being in the form of vapor and the remainder in the form of liquid. Ethyl ether is quite volatile and of especial value for this purpose although other liquids may be used such as carbon tetrachloride, chloroform, alcohol, carbon bisulfide and low boiling petroleum ether.

The upper chamber is cooled to a temperature below normal by causing a rapid evaporation about the same. This causes condensation of the vapor or gas or reduction of its pressure within the upper chamber, whereas in the lower chamber, which is maintained at normal room temperature or higher, vaporization is taking place. The different vapor pressures thus accomplished in the respective chambers force vapor from the lower or heat chamber to the upper or cooled chamber and the movement of this vapor or gas through a glass tube creates the activity which is displayed.

The gas lift and the resultant condensation taking place within the upper chamber add to the liquid content of the upper chamber and the hydrostatic column for maintaining the hydrostatic column at a definite level. The flow of gas or vapor from the lower to the upper chamber tending to equalize the vapor pressures permits the liquid column to become effective for creating a liquid movement which may be in the form of a fountain or in the form of globule movement in circuit through another liquid.

Referring specifically to Figure 1 of the drawings, the apparatus has been constructed to include as a part thereof a bottle 10 and a tumbler 11, the tumbler being superimposed on the bottle. The circuit or liquid enclosure apparatus is constructed entirely of glass in all instances and is preferably in one piece. In this instance the entire apparatus with the exception of the tumbler 11 is in one piece. The bottle 10 functions as the heat chamber or display chamber of the apparatus and the tumbler 11 is utilized as a container for the water used in the evaporation process about the condensation or upper chamber of the apparatus.

Two tubes 12, 13, extend from the lower end of the bottle or lower chamber. One of these tubes, namely the hydrostatic tube 12, enters the lower chamber or bottle beneath the other and includes an upturned nozzle 14 disposed axially of and within the bottle 10. The other tube, namely the gas or vapor lift tube 13, is connected to the lower chamber or bottle 10 at about the level of the nozzle. These tubes extend upwardly and join to a common tube 15 which is curved inwardly above the glass which rests on the top of the bottle and includes a cool chamber 16 in the form of a hollow glass sphere disposed partly within the upper end of the glass.

A wick 17 surrounds the hollow sphere and includes portions 18 depending into the glass 11 being therefore adapted to depend into water contained in the glass. The apparatus as thus formed is left open at the top of the hollow sphere in this instance for final sealing and the liquid, which may be ether, is poured into the apparatus disposed in upright position. The apparatus is only partially filled and is then evacuated until the pressure in the space above the liquid is only that of or only slightly greater than that of the vapor of the liquid used. This degree of vacuum is maintained during the operation of the device by sealing the same from the atmosphere in any manner as by fusing the glass together at the opening, or by closing the valve extending to the opening, clamping a rubber tube, or otherwise.

In the process of evacuating the system, the open portion of the apparatus is attached to a vacuum pump and the air and excess liquid are expelled by gentle boiling under reduced pressure. In initially starting the apparatus, the difference in temperature as between the upper and lower chambers is established and the liquid will flow from the warm chamber upwardly through the tubes until the level of the liquid in the warm chamber or in the adjacent portion of the gas lift passageway is barely lower than the nozzle of the hydrostatic tube. At this time the upper chamber will be partially filled with liquid or filled to the point of overflow into the tube and the tubes will be filled with a liquid to or nearly to the junction with the common tube. A slightly further rise in the liquid allows gas to enter the gas lift tube.

As has been explained before, as long as a difference in temperature is maintained between the lower or heat chamber and the upper or cool chamber the gas or vapor will move from the lower chamber to the upper and the liquid will move from the upper to the lower. The liquid used has been selected because it has a high vapor pressure at room temperature. The evaporation taking place about the upper chamber drawing heat from the upper chamber lowers the temperature of this chamber and cooling of the vapor and condensation occurs within the chamber and the vapor pressure is accordingly lowered.

The liquid resulting from condensation overflows and is received in the hydrostatic and gas lift tubes. The vapor pressure in the lower heat chamber is higher than that in the upper chamber since vaporization is constantly taking place, gas or vapor therefore being driven from the level of the nozzle through the gas lift tube to the upper chamber. This carries the liquid upwardly in the gas lift tube and maintains the level of liquid in the hydrostatic tube. As the vapor pressures have a tendency to equalize, the gas flowing from the lower to the upper, the hydrostatic column is effective for creating a fountain of water from the nozzle. Usually the escape of gas into the upper passage and its flow mixed with liquid toward the cool chamber is rapid enough to cause a continuous flow of liquid from the upper passage down the lower passage toward and into the warm chamber. At other times the flow may stop and then become quickly re-established in the manner just described so that it may be said to be recurrent or intermittent.

Referring to Figure 2 of the drawings, a different arrangement of the tubes and relation of the chambers is illustrated. The lower or heat chamber 19 is connected to an upper or cool chamber 20 by a gas lift tube 21 and a hydrostatic tube 22. In the connection of the tubes the lowest point 23 or the upper wall of the bend 24 of the gas lift tube 21 which vapor must reach to escape into the portion of the gas lift tube ascending to the cool chamber must be in a higher position than the lowest portion 25 of the upper wall of the bend 26 of the hydrostatic tube 22.

As an example of the exact structure of the apparatus of Figure 2, the following dimensions are given: The heat chamber may be a glass cylinder 150 millimeters long and 30 millimeters in diameter. The upper or cool chamber may be an Erlenmeyer flask of 250 cubic centimeters capacity. The gas lift tube 21 which opens into the bottom of the heat chamber at its lower end and into a larger tube 27 forming part of the upper or cool chamber at its other end may be 3 millimeters in inside diameter and 150 millimeters long from its upper end where it enters the cool chamber to its lowest vapor escape point 23 near its opening into the heat chamber.

The hydrostatic tube connecting the heat chamber with the cool chamber as shown runs parallel with the gas lift tube for part of its length and then passes in the loop 26 well below the heat chamber and enters the lower end of the heat chamber in the form of the nozzle 14. The lowest portion 25 of this tube may be 50 millimeters below the upper vapor escape point 23 in the gas lift tube. The openings of both tubes into the cool chamber may be at nearly the same level when the device is in an upright or operable position.

The device is held in a water bath at a temperature of 35° C. during evacuation until approximately 25 cubic centimeters of ether has been boiled away. The amount of liquid left in the device may be such that just before vapor escapes into the ascending part of the gas lift tube and just before liquid starts to flow from the hydrostatic tube into the heat chamber, the level of liquid in the tubes will be just below their openings into the cool chamber and the level of liquid in the cool chamber will be such that any additional liquid will flow out into the tubes. This form of device may be cooled in the same manner as the preceding, by means of the wick 17 surrounding the cool chamber and depending into water in a reservoir for maintaining a relatively lower temperature by the evaporation of water from the wick.

In this and other forms it is essential that the difference of level in the openings of the two tubes 21, 22, into the cool chamber shall be somewhat less than the difference of level between the upper wall of the loops of the gas lift tube and the hydrostatic tube when the device is in the position in which it is designed to operate. If the gas lift tube extends above its opening into the cool chamber, the highest point which the liquid must reach to flow into the cool chamber or into the hydrostatic tube must differ in level from the level of the opening of the hydrostatic tube into the cool chamber by less amount than the difference in level between the upper wall of the loops of the respective tubes. The device will also operate satisfactorily if the volume of liquid is such that the upper level is above the openings of both tubes into the cool chamber during operation.

Referring to Figure 3 of the drawings, a modification in the arrangement of the tubes is disclosed. In this modification gas lift tube 21 has been placed inside the hydrostatic tube 22 and the hydrostatic tube has been modified at its lower end to accommodate the gas lift tube and to enhance the beauty of the device. The appearance of the apparatus is a little more complicated and will therefore arouse a little more curiosity.

Describing the structure of this modification, the upper chamber 20 is connected to the lower chamber 19 by means of a relatively large tube in this instance the hydrostatic tube 22. The lower chamber is of elongated or cylindrical form and has its bottom 30 formed just above the entrance of the described tube 21 into the same. The gas lift tube 22 is contained in the previously described tube being of smaller diameter for this purpose. This tube 22 extends above the level of the entrance of the outside tube into the upper chamber and is connected to the bottom of the lower or heat chamber 19. That portion 31 of the cylinder forming the lower chamber which is below the bottom constitutes an extension of the hydrostatic or liquid tube. A nozzle tube 32 is disposed to extend slightly above the bottom of the heat chamber and to depend into the previously described extension. This apparatus functions in the same manner as the preceding devices insofar as the cycle of movement of the vapor and liquid is concerned.

Referring to Figure 4 which illustrates a portion of the apparatus, the lower or heat chamber 19 is spherical and is shown as including or mounting a paddle wheel 33. The paddle wheel is intended for display for attracting attention by its movement. The paddle wheel is operated by a jet of water ensuing from a nozzle 34 which enters the upper side of the spherical heat chamber 20 and is at the end of the hydrostatic tube 22 described in the other forms. The gas lift tube 21 extends from the bottom of the heat chamber. The remainder of this apparatus is identical to that of the others, the modification residing in the provision of the paddle wheel operated by the jet of water.

Referring to Figure 5, another modification is illustrated in which two liquids are used, one of which is more active or volatile than the other, as for example, the use of ether in conjunction with water. In this apparatus the same general arrangement of parts is present, lower and upper chambers 19, 20, being used and gas lift and hydrostatic tubes 21, 22 being included. The hydrostatic tube 22 has its nozzle 14 extended into the lower end of the lower or heat chamber and disposed upwardly.

The gas lift tube 21 extends from an intermediate level of the heat chamber to an intermediate level of the upper or cool chamber 20 adjacent to the hydrostatic tube connection but slightly above the same as at 35. In this form of apparatus the water as at 36 is contained in the heat chamber and is in sufficient volume to maintain a level somewhat below the outlet of the gas lift tube. The ether is contained in the upper or cool chamber and in the upper part of the heat chamber, the vapor or ether gas being above the liquid in the respective chambers as in the other forms.

It will be apparent that as the movement of gas or vapor from the upper end of the heat chamber takes place through the gas lift tube 21 to the upper or cool chamber 20 tending to equalize vapor pressures, the liquid in the hydrostatic tube 22 will move downwardly and will flow from the nozzle 14 in the form of globules 37 rising through the water to the liquid ether level above the water, thus displaying movement of the ether through the water. The ether may be colored and the water retained in its natural color so that the globules will present an attractive appearance as they move upwardly through the water. The ether will remain on top of the water and the vapor in the device will be mostly ether vapor.

Referring to Figure 6, this form is somewhat akin to that disclosed in Figure 5 except that the volatile liquid used is heavier than water and will be disposed at the bottom of the heat chamber so that the movement of the liquid will be downwardly by gravity. Carbon tetrachloride or chloroform is used in conjunction with water or some other suitable liquid lighter than carbon tetrachloride.

The apparatus in this form includes the heat chamber 20 which is maintained at room temperature for vaporization of the carbon tetrachloride. The heat chamber connects directly with a display cylinder or enlarged hydrostatic tube 38 disposed in an upright position alongside the heat or vaporization chamber, the connection 39 between these chambers being at the bottoms thereof. The cool or condensation chamber is spherical and is connected by a passageway 40 to the upper end of the display cylinder.

The gas lift tube 21 connects an intermediate level of the heat chamber with the upper end of the display cylinder 38 and includes a downwardly extended nozzle 14 disposed below the overflow level of the condensation chamber. The carbon tetrachloride is of sufficient volume to form pools in the cool or condensation chamber and in the connected lower ends of the display chamber and the heat or vaporization chamber.

The water or lighter liquid indicated at 41 is disposed in the display chamber and has its level above the level of the carbon tetrachloride in the condensation chamber to form the hydrostatic column. The vapor above the carbon tetrachloride in the heat chamber and above the water level in the cool or condensation chamber is essentially a carbon tetrachloride vapor. The flow of the carbon tetrachloride is through the gas lift tube upwardly from a level at the entrance to the carbon tetrachloride tube at the heat chamber and downwardly through the display tube in the form of drops or globules 37 whereupon the carbon tetrachloride again mingles with the pool at the bottom of the display cylinder.

Some of the carbon tetrachloride overflows from the condensation chamber flowing through the display tube as shown, this latter occurring because of condensation of carbon tetrachloride vapor in the cool chamber adding to the volume and causing overflow. The water level and arrangement is substantially stationary and aids in the display. As condensation occurs due to rapid evaporation about the upper chamber and carbon tetrachloride liquid overflows, there is a tendency to increase the level of the carbon tetrachloride in the heat chamber.

The color of the liquid may be varied depending on the liquid which the apparatus is advertising. For example, the liquid may be colored red by Sudan III. Iodine will give orange or brown color to a solution in ethyl ether and shades of violet or purple in carbon tetrachloride or chloroform. Many standard bacteriological stains may be used in alcohol, or in water, in the forms in which two liquids are used. Water and Sudan III in ether make a beautiful striking contrast in the fountain of alternate colors.

Having described our invention, we claim:

1. An apparatus enclosing a volatile liquid and and its vapor, comprising, a lower vaporization chamber, an upper condensation chamber, a vapor lift tube connecting said chambers, a hydrostatic pressure tube connecting said chambers including a jet projecting into the lower chamber, and means for lowering the temperature at the upper chamber, whereby as condensation takes place in the upper chamber and the vapor pressure is lowered vapor rises from the lower chamber through the vapor lift tube and the hydrostatic pressure in the hydrostatic tube is effective for forcing the liquid out of the jet.

2. An apparatus enclosing a volatile liquid and its vapor, comprising, a lower vaporization chamber, an upper condensation chamber, a vapor lift tube connecting said chambers, a hydrostatic pressure tube connecting said chambers and extending below the lowest vapor escape point of the vapor lift tube, and means for lowering the temperature at the upper chamber, whereby as condensation takes place in the upper chamber and the vapor pressure is lowered vapor rises from the lower chamber carrying liquid therewith through the vapor lift tube and the hydrostatic pressure in the hydrostatic tube is effective for forcing the liquid into the lower chamber.

3. A transparent apparatus enclosing a volatile liquid and its vapor, comprising, a lower vaporization chamber, an upper condensation chamber, a vapor lift tube connecting said chambers, a hydrostatic pressure tube connecting said chambers, and means for lowering the temperature at the upper chamber whereby condensation takes place in the upper chamber and the vapor pressure is lowered permitting vapor to rise from the lower chamber through the vapor lift tube carrying liquid therewith and the hydrostatic pressure in the hydrostatic tube is effective for forcing the liquid into the lower chamber.

4. In a device of the class described; an apparatus formed of glass and containing volatile liquid and its vapor and consisting of a bottle forming a vaporization chamber, a condensation chamber disposed above the bottle, a tube extending between the bottle and the condensation chamber, said tube divided to form a hydrostatic tube and a gas lift tube entering the condensation chamber, the hydrostatic tube entering the vaporization chamber below the gas lift tube and including an upwardly disposed jet having its outlet on substantially the same plane as the connection of the gas lift tube to the bottle; a tumbler mounted on top of the bottle, and a wick disposed about the upper chamber and depending into the tumbler, whereby condensation of vapor in the upper chamber caused by evaporation lowers the vapor pressure in the upper chamber and permits vapor to flow upwardly from the lower chamber through the gas lift tube increasing the hydrostatic pressure in the hydrostatic tube for creating a fountain of liquid from the jet.

5. An apparatus enclosing a volatile liquid and its vapor, comprising, a casing including a vaporization chamber, a condensation chamber disposed above the vaporization chamber, a relatively large hydrostatic pressure tube connecting said chambers, said tube connecting to the vaporization chamber at the lower end thereof, a gas lift tube disposed within the hydrostatic tube, said gas lift tube having its upper end disposed above the upper or intake level of the hydrostatic tube and its lower end connected to the bottom of the vaporization chamber, a nozzle tube disposed axially of the vaporization chamber and extending beneath the same into that portion of the casing beneath the bottom of the vaporization chamber, whereby condensation in the upper chamber lowers the vapor pressure therein and permits vapor to rise and elevate liquid in the gas lift tube, whereby the hydrostatic pressure is effective for causing a fountain of liquid to be ejected from the nozzle.

6. An apparatus enclosing a volatile liquid and its vapor, comprising, a casing including a vaporization chamber, a condensation chamber disposed above the vaporization chamber, a relatively large hydrostatic pressure tube connecting said chambers, said tube connecting to the vaporization chamber at the lower end, a gas lift tube disposed within the hydrostatic tube and connected to the bottom of the vaporization chamber, a nozzle tube disposed axially of the vaporization chamber and extending beneath the same into that portion of the casing beneath the bottom of the vaporization chamber, whereby condensation in the upper chamber lowers the vapor pressure therein and permits vapor to rise and elevate liquid in the gas lift tube, thereby the hydrostatic pressure is effective for causing a fountain of liquid to be ejected from the nozzle.

7. In a device of the class described; an apparatus formed of glass and containing volatile liquid and its vapor and consisting of a bottle forming a vaporization chamber, a condensation chamber disposed above the bottle, a hydrostatic tube and a gas lift tube connecting the condensation chamber and the vaporization chamber; a tumbler mounted on top of the bottle, and a wick disposed about the upper chamber and depending into the tumbler, whereby condensation of vapor in the upper chamber caused by evaporation relieves the vapor pressure in the upper chamber and permits vapor to flow upwardly from the lower chamber through the gas lift tube, the hydrostatic pressure in the hydrostatic tube thereupon being effective for creating a fountain of liquid from the jet.

8. An apparatus enclosing a volatile liquid and its vapor, comprising, a vaporization chamber, a condensation chamber disposed above the vaporization chamber, tubes connecting said chambers, one of said tubes being a gas lift tube and extending from substantially the base of the vaporization chamber and the other being a hydrostatic tube extending from the extreme base of the vaporization chamber, said latter tube having its lowermost portion disposed below the lowermost portion of the gas lift tube, said hydrostatic tube including a jet extended upwardly into the vaporization chamber.

9. An apparatus enclosing a volatile liquid and its vapor, comprising, a vaporization chamber, a condensation chamber disposed above the vaporization chamber, tubes connecting said chambers, one of said tubes being a gas lift tube and extending from substantially the base of the vaporization chamber, and the other being a hydrostatic tube extending from the extreme base of the vaporization chamber, said latter tube having its lowermost portion disposed below the lowermost portion of the gas lift tube, said hydrostatic tube including a jet extended axially upwardly into the vaporization chamber, the difference between the lowermost levels of the gas lift tube and the hydrostatic tube being greater than the difference between the levels of the outflow and the inflow tubes within the condensation chamber.

10. An apparatus enclosing a volatile liquid and its vapor, comprising, an upper condensation chamber, a lower vaporization chamber, a gas lift tube connecting the respective chambers, a hydrostatic tube connecting the respective chambers and depending below the gas lift tube, said hydrostatic tube including a nozzle, a paddle wheel journalled in the vaporization chamber, said paddle wheel and nozzle corelated whereby liquid flow from the nozzle as induced by hydrostatic pressure caused by gas lift causes rotation of the paddle wheel.

11. In a device of the class described; an apparatus formed of glass and containing volatile liquid and its vapor and consisting of a bottle forming a vaporization chamber, a condensation chamber disposed above the bottle, a hydrostatic tube and a gas lift tube connecting the condensation chamber and the vaporization chamber; and a tumbler mounted on top of the bottle, whereby condensation of vapor in the upper chamber caused by evaporation relieves the vapor pressure in the upper chamber and permits vapor to flow upwardly from the lower chamber through the gas lift tube, the hydrostatic pressure in the hydrostatic tube thereupon being effective for creating a fountain of liquid from the jet.

12. An apparatus enclosing a volatile liquid and its vapor, comprising, a lower vaporization chamber, an upper condensation chamber, a vapor lift tube connecting said chambers, a hydrostatic pressure tube connecting said chambers and extending below the lowest vapor escape point of the vapor lift tube, one of said tubes including a nozzle disposed for discharge into the vaporization chamber whereby the circulation induced by condensation causes a discharge of liquid.

13. An apparatus enclosing a volatile liquid and its vapor, comprising, a lower vaporization chamber, an upper condensation chamber, a vapor lift tube connecting said chambers, a hydrostatic pressure tube connecting said chambers and extending below the lowest vapor escape point of the vapor lift tube, and said vapor lift tube having its end connected to the vaporization chamber intermediate of the height thereof whereby the escaping vapor moving upwardly in the vapor lift tube carries liquid therewith.

14. An apparatus enclosing a volatile liquid and its vapor, comprising, a lower vaporization chamber, an upper condensation chamber, a vapor lift tube connecting said chambers, a hydrostatic pressure tube connecting said chambers and extending below the lowest vapor escape point of the vapor lift tube, and said vapor lift tube having its end connected to the vaporization chamber intermediate of the height thereof whereby the escaping vapor moving upwardly in the vapor lift tube carries liquid therewith, one of said tubes including a nozzle disposed for discharge into the vaporization chamber whereby the circulation induced by condensation causes a discharge of liquid.

15. An apparatus enclosing a volatile liquid and its vapor, comprising, a transparent lower vaporization chamber, an upper condensation chamber, a transparent vapor lift tube connecting said chambers, a hydrostatic pressure tube connecting said chambers and extending below the lowest vapor escape point of the vapor lift tube, one of said tubes including a discharge nozzle for discharging liquid for display purposes.

FREDERIC E. HOLMES.
ARNON O. SNODDY.